(12) United States Patent
Bhatt et al.

(10) Patent No.: US 10,489,438 B2
(45) Date of Patent: Nov. 26, 2019

(54) METHOD AND SYSTEM FOR DATA PROCESSING FOR TEXT CLASSIFICATION OF A TARGET DOMAIN

(71) Applicant: Conduent Business Services, LLC, Dallas, TX (US)

(72) Inventors: Himanshu Sharad Bhatt, Uttam Nagar (IN); Manjira Sinha, Bengaluru (IN); Shourya Roy, Bangalore (IN)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 589 days.

(21) Appl. No.: 15/158,626

(22) Filed: May 19, 2016

(65) Prior Publication Data

US 2017/0337266 A1 Nov. 23, 2017

(51) Int. Cl.
*G06F 16/00* (2019.01)
*G06F 16/35* (2019.01)
*G06F 16/335* (2019.01)

(52) U.S. Cl.
CPC ............ *G06F 16/35* (2019.01); *G06F 16/335* (2019.01)

(58) Field of Classification Search
CPC ......... G06F 17/30734; G06F 17/30654; G06F 17/30979; G06F 17/30914; G06F 17/30958; G06F 17/30705; G06F 17/30528; G06F 17/30241; G06F 17/30259; G06F 17/30563; G06F 17/30864; G06F 17/2785; G06F 17/279; G06F 17/30489; G06F 17/30539; G06F 17/30684; G06F 17/30867; G06F 21/6254; G06F 3/0481; G06F 12/0215
See application file for complete search history.

(56) References Cited

U.S. PATENT DOCUMENTS

2003/0233232 A1* 12/2003 Fosler-Lussier .... G10L 15/1815
  704/251
2008/0243837 A1* 10/2008 Davis .................... G06F 16/334
(Continued)

OTHER PUBLICATIONS

C-W. Hsu, C.-C. Chang, and C.-J. Lin. 2003. A practical guide to support vector classification. Technical report, Department of Computer Science, National Taiwan University.
(Continued)

*Primary Examiner* — Yicun Wu
(74) *Attorney, Agent, or Firm* — Jones Robb, PLLC

(57) ABSTRACT

The disclosed embodiments illustrate methods of data processing for text classification of a target domain. The method includes generating a plurality of clusters from a plurality of first text segments corresponding to a plurality of source domains, based on an association of the plurality of first text segments with a plurality of categories. The method further includes computing a similarity score of each of a plurality of second text segments corresponding to the target domain for each of the plurality of clusters. The method further includes identifying a pre-specified count of clusters from the plurality of clusters, based on the computed similarity score. Further, the method includes training a first classifier by utilizing first text segments in the identified pre-specified count of clusters, wherein the trained first classifier is utilized to automatically classify the plurality of second text segments into categories associated with the identified pre-specified count of clusters.

20 Claims, 6 Drawing Sheets

(56) References Cited

U.S. PATENT DOCUMENTS

2011/0055238 A1* 3/2011 Slaney .............. G06F 17/30657
707/759
2018/0068231 A1* 3/2018 Sharma ................ G06N 99/005

OTHER PUBLICATIONS

Shiliang Sun, Honglei Shi, and YuanbinWu. 2015. A survey of multi-source domain adaptation. Information Fusion, 24:84-92.

H. S. Bhatt, D. Semwal, and S. Roy. 2015. An iterative similarity based adaptation technique for cross-domain text classification. In Proceedings of CoNLL.

John Blitzer, Mark Dredze, and Fernando Pereira. 2007b. Biographies, bollywood, boom-boxes and blenders: Domain adaptation for sentiment classification. In ACL, vol. 7, pp. 440-447. Citeseer.

S. J. Pan, X. Ni, J-T Sun, Q. Yang, and Z. Chen. 2010. Crossdomain sentiment classification via spectral feature alignment. In Proceedings International Conference on World Wide Web, pp. 751-760. ACM.

Hal Daum'e III. 2009. Frustratingly easy domain adaptation. arXiv preprint arXiv:0907.1815.

J. Jiang and C. Zhai. 2007. Instance weighting for domain adaptation in NLP. In Proceedings of Association for Computational Linguistics, vol. 7, pp. 264-271.

Sinno Jialin Pan, James T Kwok, and Qiang Yang. 2008. Transfer learning via dimensionality reduction. In AAAI, vol. 8, pp. 677-682.

Rong-En Fan, Kai-Wei Chang, Cho-Jui Hsieh, Xiang-Rui Wang, and Chih-Jen Lin. 2008. LIBLINEAR: a library for large linear classification. Journal of Machine Learning Research, 9:1871-1874.

Young-Bum Kim, Karl Stratos, Ruhi Sarikaya, and Minwoo Jeong. 2015. New transfer learning techniques for disparate label sets. In Proceedings of Association for Computational Linguistics.

S. J. Pan, I. W. Tsang, J. T. Kwok, and Q. Yang. 2011. Domain adaptation via transfer component analysis. IEEE Transactions on Neural Networks, 22(2):199-210.

J. Blitzer, R. McDonald, and F. Pereira. 2006. Domain adaptation with structural correspondence learning. In Proceedings of Conference on Empirical Methods in Natural Language Processing, pp. 120-128.

\* cited by examiner

METHOD AND SYSTEM FOR DATA PROCESSING FOR TEXT CLASSIFICATION OF A TARGET DOMAIN

TECHNICAL FIELD

The presently disclosed embodiments are related, in general, to data processing. More particularly, the presently disclosed embodiments are related to methods and systems for data processing for text classification of a target domain.

BACKGROUND

Mostly, machine learning (ML) based automation systems are supervised systems, and primarily rely on labeled examples coded by analysts for learning specific tasks, such as classification. The idea to use ML-based automation systems has led to significant contributions to domain adaptation and transfer learning (DA/TL) techniques. The DA/TL techniques leverage knowledge from one or multiple previous (source) domains to learn the task in the new (target) domain.

Advancements in DA/TL techniques are also exploited in same-domain and cross-domain text classification. However, in certain scenarios, the implementation of the DA/TL techniques in cross-domain classification may be cumbersome due to dissimilar data distributions and disparate label sets associated with different source domains. Thus, an advanced technique may be desired that may efficiently perform cross-domain classification irrespective of the dissimilarity in data distributions and disparity in label sets associated with different source domains.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method of data processing for text classification of a target domain. The method includes generating, by one or more processors, a plurality of clusters from a plurality of first text segments corresponding to a plurality of source domains, based on an association of the plurality of first text segments with a plurality of categories, wherein a cluster in the plurality of clusters is associated with a category in the plurality of categories. The method further includes computing, by the one or more processors, a similarity score of each of a plurality of second text segments corresponding to the target domain for each of the plurality of clusters. The method further includes identifying, by the one or more processors, a pre-specified count of clusters from the plurality of clusters, based on the computed similarity score, wherein the identified pre-specified count of clusters encompass maximum count of the plurality of second text segments. The method further includes training, by the one or more processors, a first classifier by utilizing first text segments in the identified pre-specified count of clusters, wherein the trained first classifier is utilized to automatically classify the plurality of second text segments into categories associated with the identified pre-specified count of clusters.

According to embodiments illustrated herein, there is provided a system data processing for text classification of a target domain. The system includes one or more processors configured to generate a plurality of clusters from a plurality of first text segments corresponding to a plurality of source domains, based on an association of the plurality of first text segments with a plurality of categories, wherein a cluster in the plurality of clusters is associated with a category in the plurality of categories. The one or more processors are further configured to compute a similarity score of each of a plurality of second text segments corresponding to the target domain for each of the plurality of clusters. The one or more processors are further configured to identify a pre-specified count of clusters from the plurality of clusters, based on the computed similarity score, wherein the identified pre-specified count of clusters encompass maximum count of the plurality of second text segments. The one or more processors are further configured to train a first classifier by utilizing first text segments in the identified pre-specified count of clusters, wherein the trained first classifier is utilized to automatically classify the plurality of second text segments into categories associated with the identified pre-specified count of clusters.

According to embodiments illustrated herein, there is provided a computer program product for use with a computing device. The computer program product comprises a non-transitory computer readable medium storing a computer program code for data processing for text classification of a target domain. The computer program code is executable by one or more processors in the computing device to generate a plurality of clusters from a plurality of first text segments corresponding to a plurality of source domains, based on an association of the plurality of first text segments with a plurality of categories, wherein a cluster in the plurality of clusters is associated with a category in the plurality of categories. The computer program code is further executable by the one or more processors to compute a similarity score of each of a plurality of second text segments corresponding to the target domain for each of the plurality of clusters. The computer program code is further executable by the one or more processors to identify a pre-specified count of clusters from the plurality of clusters, based on the computed similarity score, wherein the identified pre-specified count of clusters encompass maximum count of the plurality of second text segments. The computer program code is further executable by the one or more processors to train a first classifier by utilizing first text segments in the identified pre-specified count of clusters, wherein the trained first classifier is utilized to automatically classify the plurality of second text segments into categories associated with the identified pre-specified count of clusters.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided

DETAILED DESCRIPTION

Figure 1:
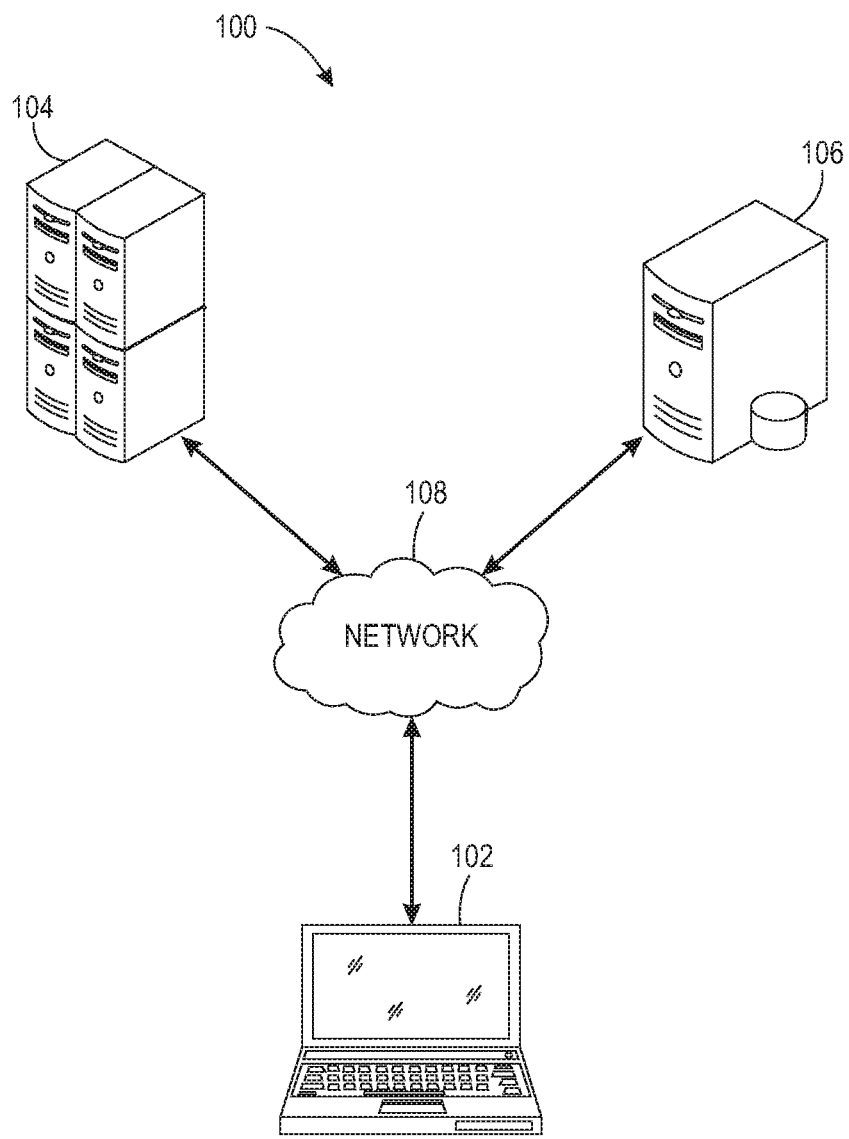
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "user-computing device" refers to a computer, a device (that includes one or more processors/microcontrollers and/or any other electronic components), or a system (that performs one or more operations according to one or more programming instructions/codes) associated with a user. Examples of the user-computing device may include, but are not limited to, a desktop computer, a laptop, a personal digital assistant (PDA), a mobile device, a smartphone, and a tablet computer (e.g., iPad® and Samsung Galaxy Tab®).

A "plurality of source domains" corresponds to a plurality of technical or business fields to which a plurality of first text segments is related. In an embodiment, the plurality of first text segments corresponding to the plurality of source domains may be associated with a plurality of categories. In an embodiment, the categorized plurality of first text segments may be utilized to train a classifier for classification of text segments into the plurality of categories.

A "plurality of categories" corresponds to a plurality of labels/tags associated with text content. In an embodiment, the text content may be classified into the plurality of categories based on one or more features associated with the text content, such as lexical features, semantic features, syntactic features and/or the like. In an embodiment, the text content may be manually categorized into the plurality of categories. In another embodiment, the text content may be categorized into the plurality of categories by utilizing a trained classifier. In an embodiment, a plurality of second text segments may be classified into one or more categories of the plurality of categories associated with a plurality of first text segments.

A "plurality of first text segments" corresponds to text content associated with a plurality of source domains. Each of the plurality of first text segments is associated with a category of a plurality of categories. In an embodiment, the plurality of first text segments may be utilized to train a classifier to classify a plurality of second text segments corresponding to a target domain. Examples of the plurality of first text segments may include a comment, a post, a share, a tweet, and/or the like by one or more users on a social networking site. In another embodiment, the plurality of first text segments may be generated by converting a plurality of first audio segments into text by utilizing one or more speech to text conversion techniques.

A "plurality of clusters" corresponds to a plurality of groups or a collection comprising first text segments. In an embodiment, a plurality of first text segments is tessellated into the plurality of clusters based on an association of the plurality of first text segments with a plurality of categories. Each of the plurality of clusters is associated with a category of the plurality of categories.

A "centroid" of a cluster refers to an average of scores associated with text segments in the cluster.

A "score" corresponds to a measure of importance of a keyword in a text segment of a plurality of text segments. In an embodiment, the score of a keyword is directly proportional to a number of times the keyword appears in the text segment and inversely proportional to a number of times the keywords appear in the plurality of text segments. For example, a first keyword "attention" appears twice in a text segment comprising 10 keywords and further appears in 8 segments in a plurality of text segments comprising 20 text segments. Similarly, a second keyword "the" appears twice in the text segment comprising 10 keywords and further appears in 15 text segments in the plurality of text segments comprising 20 text segments. Thus, the score (i.e., 0.5) for the first keyword "attention" is higher compared with the score (i.e., 0.267) for the second keyword "the."

A "target domain" corresponds to a technical or business field to which a plurality of second text segments is related. In an embodiment, the plurality of second text segments associated with the target domain is classified into one or more categories by utilizing a trained classifier. For example, a plurality of second text segments corresponding to a domain "books" is classified into one or more categories, such as "science," "history," "geography" and "mathematics," by utilizing a trained classifier.

A "plurality of second text segments" corresponds to text content associated with a target domain. The plurality of second text segments is independent of any category. In an embodiment, the plurality of second text segments may be classified into one or more categories by utilizing a trained classifier. Examples of the plurality of second text segments may include a comment, a post, a share, a tweet, and/or the like by one or more users on a social networking site. In another embodiment, the plurality of second text segments may be generated by converting a plurality of second audio segments into text by utilizing one or more speech to text conversion techniques.

A "classifier" refers to a mathematical model that may be configured to classify text segments in a plurality of categories. In an embodiment, the classifier is trained based on training data. Examples of the classifier may include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier.

"Training" refers to a process of updating/tuning a classifier using training data such that the classifier, once trained, may be able to classify the target data into a category of a plurality of categories.

A "weight" corresponds to a relevance score assigned to a first text segment to be used as training data to classify a plurality of second text segments. In an embodiment, a first text segment with a higher weight may represent that the first text segment is more relevant for classifying the plurality of second text segments as compared with other first text segments. In an embodiment, a classifier may be utilized to assign the weight to first text segments associated with a pre-specified count of clusters.

A "tabular data structure" corresponds to a matrix representation of data. The tabular data structure may comprise one or more rows and one or more columns. In an embodiment, a count of the one or more rows in the tabular data structure may be equal to a count of second text segments in a plurality of second text segments corresponding to a target domain. In an embodiment, a count of the one or more columns in the tabular data structure may be equal to a count of categories in a plurality of categories associated with a plurality of first text segments corresponding to a plurality of source domains. In an embodiment, an element in a row in the tabular data structure may correspond to a similarity score.

A "pre-specified count of clusters" refers to a count of clusters identified from a plurality of clusters associated with a plurality of source domains. In an embodiment, a service provider may specify the count. Each of the pre-specified count of clusters may be associated with a category. Further, each of the pre-specified count of clusters may comprise first text segments associated with the corresponding category.

A "similarity score" refers to a score that indicates a degree of similarity between one or more text segments. In an embodiment, two similar text segments may have a higher similarity score compared with two dissimilar text segments. In an embodiment, the similarity score may be computed for each of a plurality of second text segments for each of a plurality of clusters.

FIG. 1 is a block diagram of a system environment in which various embodiments may be implemented. With reference to FIG. 1, there is shown a system environment 100 that includes a user-computing device 102, an application server 104, a database server 106, and a network 108. Various devices in the system environment 100 may be interconnected over the network 108. FIG. 1 shows, for simplicity, one user-computing device 102, one application server 104, and one database server 106. However, it will be apparent to a person having ordinary skill in the art that the disclosed embodiments may also be implemented using multiple user-computing devices, multiple application servers, and multiple database servers, without departing from the scope of the disclosure.

In an embodiment, the user-computing device 102 may refer to a computing device (associated with a user) that may be communicatively coupled to the network 108. The user-computing device 102 may include one or more processors and one or more memories. The one or more memories may include computer readable codes and instructions that may be executable by the one or more processors to perform predetermined operations as specified by the user. The predetermined operations may include transmitting a plurality of first text segments and/or a plurality of second text segments to the database server 106, over the network 108.

The user-computing device 102 may correspond to a variety of computing devices such as, but not limited to, a laptop, a PDA, a tablet computer, a smartphone, and a phablet.

A person having ordinary skill in the art will understand that the scope of the disclosure is not limited to the utilization of the user-computing device 102 by a single user. In an embodiment, the user-computing device 102 may be utilized by more than one users to transmit the plurality of first text segments and/or the plurality of second text segments to another device, such as the application server 104, via the network 108.

In an embodiment, the application server 104 may refer to a computing device or a software framework hosting an application or a software service that may be communicatively coupled to the network 108. In an embodiment, the application server 104 may be implemented to execute procedures such as, but not limited to, programs, routines, or scripts stored in one or more memories for supporting the hosted application or the software service. In an embodiment, the hosted application or the software service may be configured to perform one or more predetermined operations. In an embodiment, the one or more predetermined operations may include training a first classifier to classify the plurality of second text segments corresponding to a target domain.

In an embodiment, the application server 104 may be configured to retrieve the plurality of first text segments corresponding to a plurality of source domains and the plurality of second text segments. Prior to the retrieval of the plurality of first text segments, the application server 104 may identify the plurality of source domains, relevant to the target domain. Each of the relevant source domains may be associated with one or more categories. Further, each of the relevant source domains may constitute one or more first text segments. Furthermore, a first text segment of the one or more first text segments in a source domain may be associated with a category in the one or more categories associated with the corresponding source domain. Collectively, the one or more categories associated with each of the relevant source domains are referred to as a plurality of categories and the one or more first text segments associated with each of the relevant source domains are referred to as the plurality of first text segments. Thus, the plurality of first text segments is associated with the plurality of categories. In an embodiment, the application server 104 may determine a score for each of the plurality of first text segments and the plurality of second text segments by utilizing one or more scoring algorithms known in the art. Examples of the one or more scoring algorithms may include, but are not limited to, Term frequency-Inverse document frequency (TF-IDF) algorithm.

In an embodiment, the application server 104 may be configured to generate a plurality of clusters from the plurality of first text segments, based on the association of the plurality of first text segments with the plurality of categories, such that a cluster in the plurality of clusters is associated with a category in the plurality of categories. In addition, each cluster may comprise first text segments from the plurality of first text segments that are associated with the corresponding category. Therefore, a count of clusters in the plurality of clusters may be equal to a count of categories in the plurality of categories. In an embodiment, the application server 104 may be configured to determine a centroid for each of the plurality of clusters. The application server 104 may utilize the score associated with one or more of the plurality of first text segments in each of the plurality of clusters for determining the centroid for each of the plurality of clusters. For example, a centroid for a first cluster in the plurality of clusters is determined based on the score (e.g., TF-IDF score) of each of the first text segments in the first cluster.

In an embodiment, the application server 104 may be configured to compute a similarity score of each of the plurality of second text segments for each of the plurality of clusters. The application server 104 may utilize the score (e.g., TF-IDF score) of each of the plurality of second text segments and the centroid of each of the plurality of clusters for the computation of the similarity score of each of the plurality of second text segments for each of the plurality of clusters. The application server 104 may utilize one or more similarity measures, known in the art, for the computation of the similarity score. Examples of such one or more similarity measures may include, but are not limited to, cosine similarity, Euclidian distance, and KL divergence. Further, the application server 104 may be configured to store the computed similarity score as a tabular data structure, such as a matrix, in the database server 106. Each element in a row of the tabular data structure may represent the similarity score between a second text segment in the plurality of second text segments and a cluster in the plurality of clusters.

In an embodiment, the application server 104 may be configured to identify a pre-specified count of clusters from the plurality of clusters based on the computed similarity score. The application server 104 may utilize one or more algorithms known in the art for the identification of the pre-specified count of clusters. Examples of such one or more algorithms may include, but are not limited to, maximum coverage algorithm and greedy algorithm. In an embodiment, the identified pre-specified count of clusters encompasses the maximum count of the plurality of second text segments (i.e., a count of second text segments from the plurality of second text segments associated with the identified pre-specified count of clusters is highest).

In an embodiment, the application server 104 may utilize first text segments in the identified pre-specified count of clusters to train a first classifier. The first text segments in the identified pre-specified count of clusters may correspond to a training set for the first classifier. In another embodiment, the application server 104 may determine a weight for one or more of the plurality of first text segments associated with the identified pre-specified count of clusters by use of a second classifier. Thereafter, the application server 104 may utilize the weighted first text segments in the identified pre-specified count of clusters to train the first classifier. The weighted first text segments in the identified pre-specified count of clusters may correspond to the training set for the first classifier. In an embodiment, the application server 104 may utilize the trained first classifier to automatically classify the plurality of second text segments in categories associated with the identified pre-specified count of clusters.

The application server 104 may be realized through various types of application servers such as, but are not limited to, a Java application server, a .NET framework application server, a Base4 application server, a PHP framework application server, or any other application server framework. The operation of the application server 104 has been discussed later in FIG. 2.

In an embodiment, the database server 106 may refer to a computing device that may be communicatively coupled to the network 108. In an embodiment, the database server 106 may be configured to store the plurality of first text segments, corresponding to the plurality of source domains, associated with the plurality of categories. In an embodiment, the database server 106 may be further configured to store the plurality of second text segments, independent of the plurality of categories, associated with the target domain.

In an embodiment, a service provider may extract text content from one or more websites by utilizing one or more techniques, such as web crawling and/or the like. Examples of the text content may include a comment, a post, a share, a tweet, and/or the like shared by a plurality of users on the social networking site. In another embodiment, the service provider may extract audio content from the one or more websites by utilizing one or more techniques, such as web crawling and/or the like. Thereafter, the service provider may convert the extracted audio content into the text content by utilizing one or more speech to text conversion techniques. The service provider may further associate the extracted/converted text content with the plurality of source domains associated with the plurality of categories. The classified text content may correspond to the plurality of first text segments. Thereafter, the service provider may store the plurality of first text segments in the database server 106. In an embodiment, the service provider may extract new text content associated with the target domain. The new text content may be independent of the plurality of categories. The service provider may store the new text content in the database server 106. Thus, the new text content may correspond to the plurality of second text segments.

In an embodiment, the database server 106 may be further configured to store the plurality of second text segments after the classification in to the categories associated with the pre-specified count of clusters.

A person having ordinary skill in the art will appreciate that the scope of the disclosure is not limited to realizing the application server 104 and the database server 106 as separate entities. In an embodiment, the functionalities of the application server 104 can be integrated into the database server 106.

The network 108 corresponds to a medium through which content and messages flow among various devices of the system environment 100 (e.g., the user-computing device 102, the application server 104, and the database server 106). Examples of the network 108 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 108 in accordance with various wired and wireless communication protocols such as Transmission Control Protocol and Internet Protocol (TCP/IP), User Datagram Protocol (UDP), and 2G, 3G, or 4G communication protocols.

Figure 2:
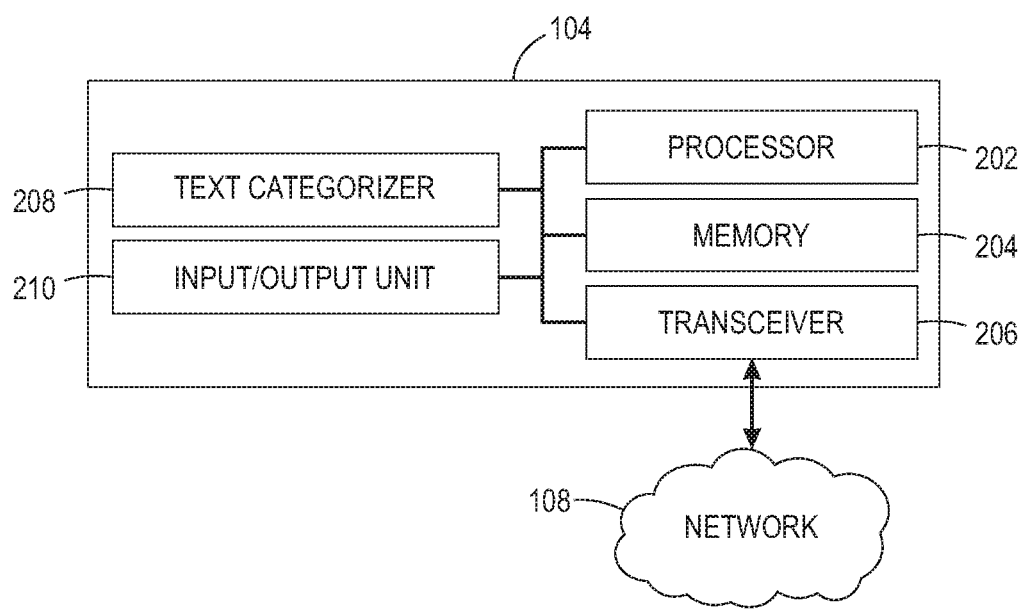
FIG. 2 is a block diagram that illustrates an application server, in accordance with at least one embodiment.

FIG. 2 is a block diagram that illustrates an application server, in accordance with at least one embodiment. FIG. 2 has been described in conjunction with FIG. 1. With reference to FIG. 2, there is shown the application server 104 that may include a processor 202, a memory 204, a transceiver 206, a text categorizer 208, and an input/output unit 210. The processor 202 is communicatively coupled to the memory 204, the transceiver 206, the text categorizer 208, and the input/output unit 210.

The processor 202 includes suitable logic, circuitry, and/or interfaces that are configured to execute one or more instructions stored in the memory 204. The processor 202 may further comprise an arithmetic logic unit (ALU) (not shown) and a control unit (not shown). The ALU may be coupled to the control unit. The ALU may be configured to perform one or more mathematical and logical operations and the control unit may control the operation of the ALU. The processor 202 may execute a set of instructions/programs/codes/scripts stored in the memory 204 to perform one or more operations for the text classification. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions that are executable by the processor 202, the transceiver 206, the text categorizer 208, and the input/output unit 210. In an embodiment, the memory 204 may include one or more buffers (not shown). The one or more buffers may store one or more of the plurality of first text segments, the plurality of second text segments, the plurality of categories corresponding to the plurality of source domains and the tabular data structure. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 may enable the hardware of the application server 104 to perform the predetermined operations, without deviating from the scope of the disclosure.

The transceiver 206 transmits/receives messages and data to/from various components, such as the user-computing device 102, and the database server 106, of the system environment 100 over the network 108. In an embodiment, the transceiver 206 may be communicatively coupled to the network 108. In an embodiment, the transceiver 206 may be configured to receive the retrieved plurality of first text segments and the plurality of the second text segments from the database server 106, over the network 108. Examples of the transceiver 206 may include, but are not limited to, an antenna, an Ethernet port, a USB port, or any other port that can be configured to receive and transmit data. The transceiver 206 receives and transmits the content/information/notifications, in accordance with various communication protocols, such as TCP/IP, UDP, and 2G, 3G, or 4G communication protocols.

The text categorizer 208 may comprise suitable logic, circuitry, interfaces and/or code that may be configured to execute the one or more instructions stored in the memory 204 for text classification. In an embodiment, the text categorizer 208 may train the first classifier to automatically classify the plurality of second text segments into the categories associated with the identified pre-specified count of clusters. In an embodiment, the text categorizer 208 may be realized through either software technologies or hardware technologies known in the art.

Though, the text categorizer 208 is depicted as independent from the processor 202 in FIG. 2, a person having ordinary skill in the art will appreciate that the text categorizer 208 may be implemented within the processor 202, without departing from the scope of the disclosure.

The input/output unit 210 may comprise suitable logic, circuitry, interfaces, and/or code that may be configured to provide an output to the user. The input/output unit 210 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

The working of the application server 104 for text classification has been explained later in FIG. 4.

Figure 3A:
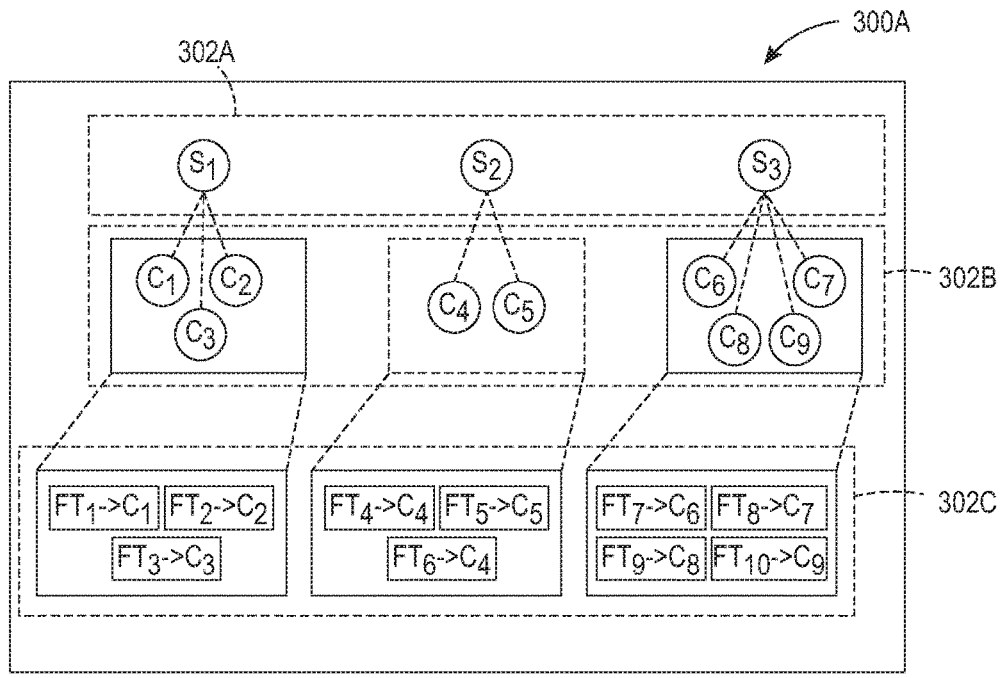
FIG. 3A is a block diagram that illustrates an exemplary scenario of a plurality of first text segments corresponding to a plurality of source domains, in accordance with at least one embodiment.

FIG. 3A is a block diagram that illustrates a plurality of first text segments corresponding to a plurality of source domains. FIG. 3A is described in conjunction with FIG. 1 and FIG. 2. With reference to FIG. 3A, there is shown a block diagram that illustrates an exemplary association 300a between an exemplary plurality of first text segments and an exemplary plurality of source domains. A person with ordinary skills in the art will understand that for brevity, the plurality of source domains 302a includes 3 source domains, the plurality of categories 302b includes 9 categories, and the plurality of first text segments 302c includes 10 first text segments. Notwithstanding, the disclosure may not be so limited, and the subsequent steps of the flowchart 400 may be further applicable to each of the one or more text segments of the text content, without deviating from the scope of the disclosure.

Each source domain, such as "$S_1$", "$S_2$", and "$S_3$", in the plurality of source domains 402a is associated with one or more categories. Source domain "$S_1$" is associated with the one or more categories, such as "$C_1$", "$C_2$" and "$C_3$". Source domain "$S_2$" is associated with the one or more categories, such as "$C_4$" and "$C_5$". Source domain "$S_3$" is associated with the one or more categories, such as "$C_6$", "$C_7$", "$C_8$" and "$C_9$". Collectively, the one or more categories associated with each of the plurality of source domains 302a are referred to as the plurality of categories 302b. Further, each category in the plurality of categories 302b is associated with one or more first text segments. For example, the categories "$C_1$", "$C_2$", and "$C_3$" are associated with the one or more first text segments "$FT_1$", "$FT_2$" and "$FT_3$", respectively. Collectively, the one or more first text segments associated with each of the plurality of categories 302b are referred to as the plurality of first text segments 302c. Table 1 depicts the association 300a between the plurality of source domains 302a, the plurality of categories 302b, and the plurality of first text segments 302c.

TABLE 1

Illustration of association between the plurality of source domains,
the plurality of categories and the plurality of first text segments.

| Plurality of source domains | Plurality of categories | Plurality of first text segments |
|---|---|---|
| $S_1$ | $C_1$ | ($FT_1 \rightarrow C_1$) |
|  | $C_2$ | ($FT_2 \rightarrow C_2$) |
|  | $C_3$ | ($FT_3 \rightarrow C_3$) |
| $S_2$ | $C_4$ | ($FT_4 \rightarrow C_4$), ($FT_6 \rightarrow C_4$) |
|  | $C_5$ | ($FT_5 \rightarrow C_5$) |
| $S_3$ | $C_6$ | ($FT_7 \rightarrow C_6$) |
|  | $C_7$ | ($FT_8 \rightarrow C_7$) |
|  | $C_8$ | ($FT_9 \rightarrow C_8$) |
|  | $C_9$ | ($FT_{10} \rightarrow C_9$) |

A person having ordinary skill in the art will understand the scope of abovementioned Table 1 is for illustrative purpose and should not be construed to limit the scope of the disclosure.

Figure 3B:
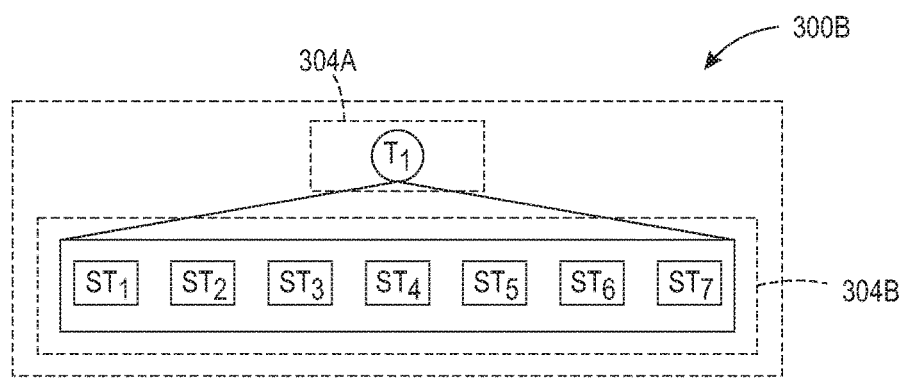
FIG. 3B is a block diagram that illustrates an exemplary scenario of a plurality of second text segments corresponding to a target domain, in accordance with at least one embodiment.

FIG. 3B is a block diagram that illustrates a plurality of second text segments corresponding to target domain. FIG. 3B is described in conjunction with FIG. 1, FIG. 2, and FIG. 3A. With reference to FIG. 3B, there is shown a block diagram that illustrates an exemplary association 300b between a plurality of second text segments and a target domain. A person with ordinary skills in the art will understand that for brevity, the plurality of second text segments 304b includes seven second text segments, "$ST_1$" to "$ST_7$". Notwithstanding, the disclosure may not be so limited, and the plurality of source domains may include more than seven second text segments, without deviating from the scope of the disclosure.

The target domain 304a is associated with the plurality of second text segments 304b. The plurality of second text segments 304b corresponds to unclassified data (i.e., the plurality of second text segments is independent of the plurality of categories 302b).

Figure 4:
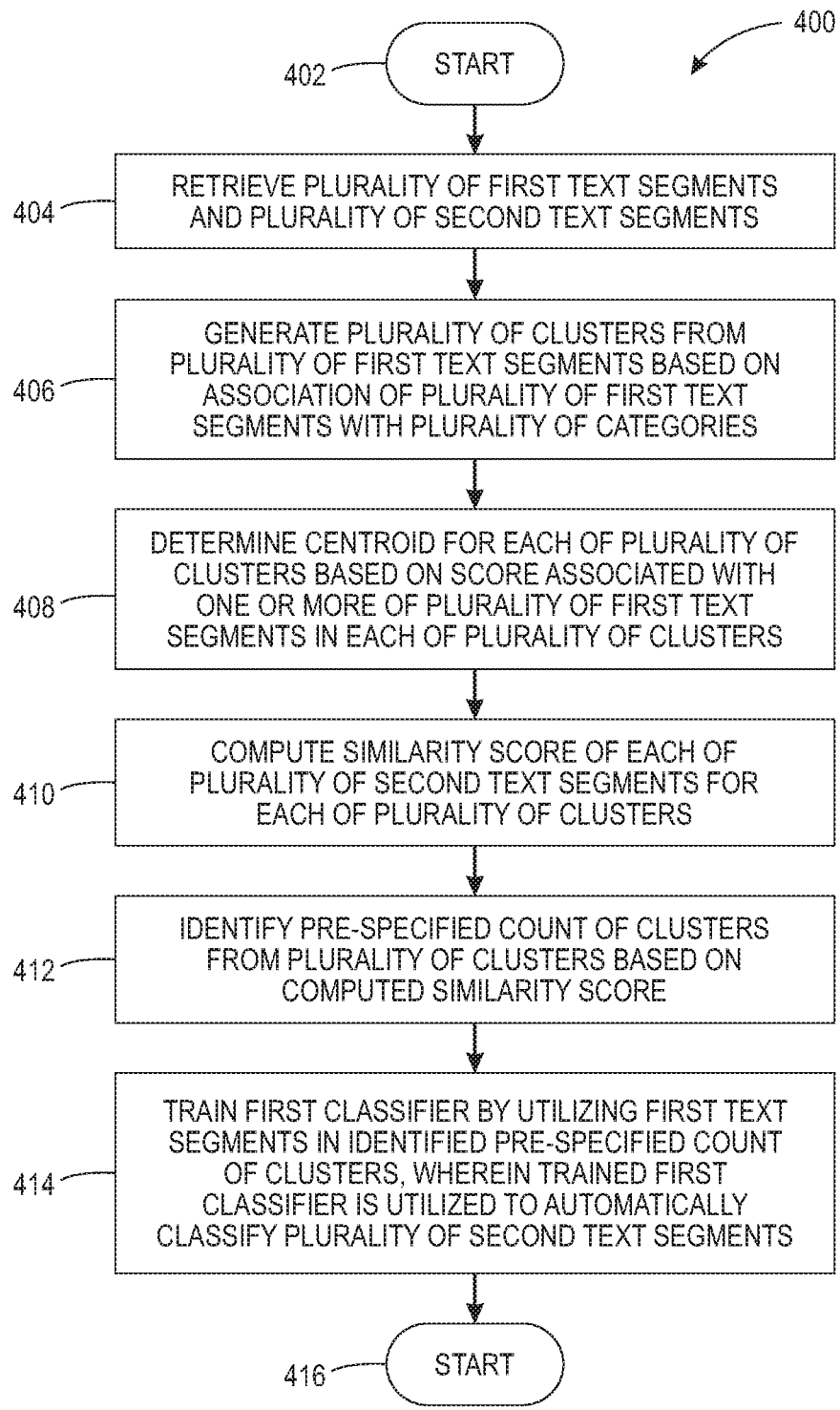
FIG. 4 is a flowchart that illustrates a method of data processing for text classification of a target domain, in accordance with at least one embodiment.

FIG. 4, depicts a flowchart that illustrates a method for data processing for text classification, in accordance with at least one embodiment. FIG. 4 is described in conjunction with FIG. 1, FIG. 2, FIG. 3A and FIG. 3B. With reference to FIG. 4, there is shown a flowchart 400 that illustrates a method for data processing for text classification. A person having ordinary skill in the art will understand that the examples, as described in FIG. 4, are for illustrative purpose and should not be construed limiting to the scope of the disclosure. The method starts at step 402 and proceeds to step 404.

At step 404, the plurality of first text segments and the plurality of second text segments are retrieved. In an embodiment, the processor 202, in conjunction with the transceiver 206, may be configured to retrieve the plurality of first text segments and the plurality of second text segments from the database server 106.

Prior to the retrieval of the plurality of first text segments and the plurality of second text segments, the transceiver 206 may receive a query from a user, such as a service provider, for the classification of the plurality of second text segments corresponding to the target domain. The query may further comprise a count specified by the service provider. Based on the target domain specified in the query, the processor 202 may be configured to retrieve the plurality of the second text segments from the database server 106. In another embodiment, the processor 202, in conjunction with the transceiver 206, may be configured to retrieve the plurality of second text segments from the one or more websites, over the network 108.

Further, based on the query, the processor 202 may be configured to identify the plurality of source domains that is relevant to the target domain. The processor 202 may utilize one or more techniques known in the art for the identification of relevant source domains. Examples of the one or more techniques for the identification of relevant source domains may include, but are not limited to, syntactic similarity, lexical similarity, and/or semantic similarity. After the identification of the plurality of relevant source domains, the transceiver 206 may retrieve the plurality of first text segments corresponding to the plurality of source domains from the database server 106. Each of the plurality of first text segments is associated with a category in the plurality of categories associated with the plurality of source domains. For example, with reference to Table 1, the processor 202 may identify "$S_1$", "$S_2$", and "$S_3$", as the relevant plurality of source domains for a target domain "$T_1$" as specified in a query. Further, a first text segment, such as "$FT_3$", in the plurality of first text segments corresponding to the source domain "$S_1$" is associated with a category "$C_3$" in the plurality of categories (i.e., "$C_1$", "$C_2$", and "$C_3$") associated with the source domain "$S_1$".

After the retrieval, the processor 202 may be configured to determine the score for each of the plurality of first text segments and each of the plurality of second text segments by utilizing the one or more scoring algorithms known in the art. Examples of the one or more scoring algorithms are TF-IDF algorithm and/or the like. In an embodiment, a first text segment in the plurality of first text segments may comprise one or more keywords. Further, the processor 202 may identify the score for each of the one or more keywords in each of the plurality of first text segments. Thus, the score associated with each of the plurality of first text segments may correspond to a vector quantity.

At step 406, the plurality of clusters is generated from the plurality of first text segments based on the association of the plurality of first text segments with the plurality of categories. In an embodiment, the processor 202 may be configured to generate the plurality of clusters from the plurality of first text segments based on the association of the plurality of first text segments with the plurality of categories. For generating the plurality of clusters, the processor 202 may tessellate the plurality of first text segments into the plurality of clusters based on the category associated with each of the plurality of first text segments. Thus, a cluster in the plurality of clusters may be associated with a category in the plurality of categories. Further, the cluster constitutes the first text segments from the plurality of first text segments that are associated with the category associated with the cluster. For example, Table 2 illustrates the plurality of clusters generated based on the plurality of first text segments, with reference to Table 1.

TABLE 2

Illustration of a plurality of clusters generated from a plurality of first text segments

| Cluster | Cluster_1 | Cluster_2 | Cluster_3 | Cluster_4 | Cluster_5 | Cluster_6 | Cluster_7 | Cluster_8 | Cluster_9 |
|---|---|---|---|---|---|---|---|---|---|
| Category associated with the cluster | $C_1$ | $C_2$ | $C_3$ | $C_4$ | $C_5$ | $C_6$ | $C_7$ | $C_8$ | $C_9$ |
| First text segments in the cluster | $FT_1$ | $FT_2$ | $FT_3$ | $FT_4$, $FT_6$ | $FT_5$ | $FT_7$ | $FT_8$ | $FT_9$ | $FT_{10}$ |

With reference to Table 2, the count of clusters (i.e., "9"), in the plurality of clusters, is equal to the count of categories in the plurality of categories associated with the plurality of source domains (i.e., "$S_1$", "$S_2$", and "$S_3$"), with reference to Table 1.

At step 408, the centroid for each of the plurality of clusters is determined based on the score associated with one or more of the plurality of first text segments in each of the plurality of clusters. In an embodiment, the processor 202 may be configured to determine the centroid for each of the plurality of clusters. In an embodiment, the processor 202 may utilize the score associated with the first text segments in each of the plurality of clusters to determine the centroid for each of the plurality of clusters. The processor 202 may determine the centroid for each of the plurality of clusters by utilizing equation 1, as shown below:

$$Centorid_q = \frac{1}{\|q\|} \sum_{(i=1, x_i \in q)}^{\|q\|} x_i \qquad (1)$$

where, $x_i$ represents the score associated with a first text segment in a cluster of the plurality of clusters;

$\|q\|$ represents a count of first text segments in a $q^{th}$ cluster of the plurality of clusters;

$Centorid_q$ represents a centroid for a first text segment of the $q^{th}$ cluster in the plurality of clusters.

For example, with reference to Table 2, the processor 202 may determine a centroid for "Cluster_4" based on the score associated with the first text segments (i.e., "$FT_4$" and "$FT_6$") in the "Cluster_4". Similarly, the centroid for each cluster in the plurality of clusters is determined.

A person having ordinary skill in the art will understand that the scope of the abovementioned example is for illustrative purpose and should not be construed to limit the scope of the disclosure.

In another embodiment, when the score associated with the first text segments in each of the plurality of clusters corresponds to the vector quantity, the processor 202 may determine the centroid of each of the plurality of clusters as the vector quantity. For example, with reference to Table 2, "Cluster_4" comprises two first text segments (i.e., "$FT_4$" and "$FT_6$"). Further, "$FT_4$" comprises three keywords (e.g., "user", "attentive" and "nature") and "$FT_6$" comprises four keywords (e.g., "natural", "response", "attentive", and "student"). In this scenario, the keyword "attentive" is common to both the first text segments, thus a count of unique keywords is six. Therefore, the centroid of "Cluster_4" may correspond to a vector quantity comprising six centroid values, one for each of the unique keywords in the first text segments of the "Cluster_4".

A person having ordinary skill in the art will understand that the scope of the abovementioned example is for illustrative purpose and should not be construed to limit the scope of the disclosure.

At step 410, the similarity score of each of the plurality of second text segments for each of the plurality of clusters is computed. In an embodiment, the processor 202 may be configured to compute the similarity score of each of the plurality of second text segments for each of the plurality of clusters. In an embodiment, the processor 202 may utilize the centroid associated with a cluster in the plurality of clusters and the score associated with a second text segment, in the plurality of second text segments, to compute the similarity score of the second text segment for the cluster. The processor 202 may compute the similarity score by utilizing the one or more similarity measures known in the art. Examples of the one or more similarity measures include, but are not limited to, cosine similarity, Euclidian distance, and KL divergence. The processor 202 may compute the similarity score by utilizing equation 2, as shown below:

$$\text{Similarity Score } (centroid_q, ST_i) = \frac{centroid_q \cdot ST_i}{\|centroid_q\| \|ST_i\|} \qquad (2)$$

where, $centroid_q$ represents a centroid of a $q^{th}$ cluster in the plurality of clusters; $ST_i$ represents the score associated with an $i^{th}$ second text segment in the plurality of second text segments;

$\|ST_i\|$ represents count of keywords in the $i^{th}$ second text segment;

$\|centroid_q\|$ represents count of centroid values in the centroid of the $q^{th}$ cluster; and Similarity Score ($centroid_q$, $ST_i$ represents a similarity score of the $i^{th}$ second text segment for the $q^{th}$ cluster.

After the computation of the similarity scores of each of the plurality of second text segments for each of the plurality of clusters, the processor 202 may store the similarity scores as the tabular data structure in the database server 106. For example, Table 3 illustrates a tabular data structure for a plurality of second text segments in a target domain "$T_1$" and a plurality of clusters determined from a plurality of first text segments associated with a plurality of source domains "$S_1$", "$S_2$", and "$S_3$".

TABLE 3

Illustration of the similarity scores of each of the plurality of second text segments for each of the plurality of clusters.

| second text segments | Clusters | | | | | | | | |
|---|---|---|---|---|---|---|---|---|---|
| | Cluster_1 | Cluster_2 | Cluster_3 | Cluster_4 | Cluster_5 | Cluster_6 | Cluster_7 | Cluster_8 | Cluster_9 |
| $ST_1$ | 0.5 | 0.3 | 0.4 | 0.2 | 0.32 | 0.76 | 0.54 | 0.65 | 0.21 |
| $ST_2$ | 0.31 | 0.54 | 0.21 | 0.45 | 0.52 | 0.89 | 0.65 | 0.43 | 0.29 |
| $ST_3$ | 0.47 | 0.34 | 0.5 | 0.67 | 0.91 | 0.23 | 0.28 | 0.18 | 0.62 |
| $ST_4$ | 0.27 | 0.32 | 0.39 | 0.62 | 0.49 | 0.79 | 0.51 | 0.55 | 0.29 |
| $ST_5$ | 0.59 | 0.24 | 0.62 | 0.79 | 0.52 | 0.31 | 0.13 | 0.43 | 0.46 |
| $ST_6$ | 0.43 | 0.87 | 0.51 | 0.37 | 0.69 | 0.63 | 0.48 | 0.26 | 0.59 |
| $ST_7$ | 0/39 | 0.44 | 0.32 | 0.59 | 0.93 | 0.23 | 0.27 | 0.45 | 0.57 |

A person having ordinary skill in the art will understand that the scope of the abovementioned example is for illustrative purpose and should not be construed to limit the scope of the disclosure.

In an embodiment, the processor 202 may be configured to binarize the similarity scores stored in the tabular data structure. In an embodiment, the processor 202 may assign a value "1" for the highest similarity score corresponding to each of the plurality second text segments and a value "0" to the remaining similarity scores in the tabular data structure. In an alternate embodiment, the processor 202 may compare the computed similarity scores with a pre-specified threshold. Based on the comparison, the processor 202 may assign the value "1" to the similarity scores that are greater than the pre-specified threshold and the value "0" to the similarity scores that are less than or equal to the pre-specified threshold. For example, Table 4 illustrates the binarized similarity scores based on a pre-specified threshold of "0.68".

In an exemplary scenario, a service provider may specify a count of clusters as "2". With reference to Table 4, the count of clusters in the plurality of clusters is "9". Thus, the processor 202 is configured to identify "2" clusters from "9" clusters, such that the two clusters encompass the maximum count of the plurality of second text segments. Based on the similarity score, the processor 202 may identify that "Cluster_5" and "Cluster_6" collectively encompass "6" out of "7" second text segments. Further, the count of the plurality of second text segments encompassed by any other combination of "2" clusters in the plurality of clusters is less than "6". Thus, the processor 202 may identify "Cluster_5" and "Cluster_6" as the pre-specified count of clusters from the plurality of clusters.

A person having ordinary skill in the art will understand that the scope of the abovementioned exemplary scenario is for illustrative purpose and should not be construed to limit the scope of the disclosure.

TABLE 4

Illustration of binarized similarity scores stored in the tabular data structure

| second text segments | Clusters | | | | | | | | |
|---|---|---|---|---|---|---|---|---|---|
| | Cluster_1 | Cluster_2 | Cluster_3 | Cluster_4 | Cluster_5 | Cluster_6 | Cluster_7 | Cluster_8 | Cluster_9 |
| $ST_1$ | 0 | 0 | 0 | 0 | 0 | 1 | 0 | 0 | 0 |
| $ST_2$ | 0 | 0 | 0 | 0 | 0 | 1 | 0 | 0 | 0 |
| $ST_3$ | 0 | 0 | 0 | 0 | 1 | 0 | 0 | 0 | 0 |
| $ST_4$ | 0 | 0 | 0 | 0 | 0 | 1 | 0 | 0 | 0 |
| $ST_5$ | 0 | 0 | 0 | 1 | 0 | 0 | 0 | 0 | 0 |
| $ST_6$ | 0 | 1 | 0 | 0 | 1 | 0 | 0 | 0 | 0 |
| $ST_7$ | 0 | 0 | 0 | 0 | 1 | 0 | 0 | 0 | 0 |

A person having ordinary skill in the art will understand that the scope of the abovementioned example is for illustrative purpose and should not be construed to limit the scope of the disclosure.

At step 412, the pre-specified count of clusters is identified from the plurality of clusters based on the computed similarity score. In an embodiment, the processor 202 may be configured to identify the pre-specified count of clusters from the plurality of clusters based on the computed similarity score. In an embodiment, the identified pre-specified count of clusters encompasses the maximum count of the plurality of second text segments. The processor 202 may utilize one or more algorithms known in the art for the identification of the pre-specified count of clusters from the plurality of clusters. Examples of such one or more algorithms may include maximum coverage algorithm, greedy algorithm, and/or the like.

In an embodiment, each of the pre-specified count of clusters may be associated with a category. For example, the "Cluster_5" and "Cluster_6" (i.e., the identified pre-specified count of clusters) are associated with categories "$C_5$" and "$C_6$", respectively (with reference to Table 2).

In an embodiment, the first text segments in the identified pre-specified count of clusters may correspond to the training set. In an embodiment, the processor 202, in conjunction with the text categorizer 208 may be configured to determine the weight for one or more of the plurality of first text segments (i.e., the training set) associated with the identified pre-specified count of clusters by use of the second classifier.

In an exemplary implementation, the text categorizer 208 may assign a label, such as "−1", to each of the first text segments (i.e., the training set) associated with the identified pre-specified count of clusters. Further, the text categorizer 208 may assign a label, such as "+1", to each of the plurality of second text segments. Thereafter, the text categorizer 208 may train the second classifier by utilizing the labeled the first text segments and the labeled plurality of second text segments. In an embodiment, the text categorizer 208 may utilize the trained second classifier to determine the weights for each of the first text segments associated with the identified pre-specified count of clusters. In an embodiment, the trained classifier may determine a higher weight for a first text segment, associated with the pre-specified count of clusters, which is similar to the plurality of second text segments. The trained classifier may determine a lower weight for a first text segment, associated with the pre-specified count of clusters, which is dissimilar to the plurality of second text segments.

The second classifier may determine the weights for each of the plurality of first text segments by utilizing equation 3, as shown below:

$$w_x = \frac{(P_t(x \mid d = \text{target}))}{(P_s(x \mid d = \text{training}))} \quad (3)$$

where, $P_t(x|d=\text{target})$ represents a probability with which the second classifier classifies a training set element (i.e., assigns a "+1" label to a first text segment associated with the pre-specified count of clusters) to the target domain;

$P_t(x|d=\text{training})$ represents a probability with which the second classifier classifies the training set element (i.e., assigns a "−1" label to the first text segment associated with the pre-specified count of clusters) to the training set; and $w_x$ represents a weight assigned to the training set element (i.e., the first text segment associated with the pre-specified count of clusters).

In an exemplary scenario, the trained classifier may assign the label "−1" to a first text segment, such as "$FT_5$", with reference to Table 2, associated with the pre-specified count of clusters (i.e., "Cluster_5", and "Cluster_6") with a probability of "0.78" and may assign the label "+1" to the first text segment "$FT_5$" with a probability of "0.22". The first text segment "$FT_5$" is dissimilar to the plurality of the second text segments. In this scenario, the weight assigned by the second classifier to the first text segment associated with the pre-specified count of clusters is "0.282". The trained classifier may further assign the label "−1" to a first text segment, such as "$FT_7$" with reference to Table 2, associated with the pre-specified count of clusters (i.e., "Cluster_5", and "Cluster_6") with a probability of "0.52" and may assign the label "+1" to the first text segment "$FT_7$" with a probability of "0.48". The first text segment "$FT_7$" is similar to the plurality of the second text segments. In this scenario, the weight assigned by the second classifier to the first text segment associated with the pre-specified count of clusters is "0.923".

A person having ordinary skill in the art will understand that the scope of the abovementioned exemplary scenario is for illustrative purpose and should not be construed to limit the scope of the disclosure.

At step 414, the first classifier is trained by utilizing the first text segments in the identified pre-specified count of clusters, wherein the trained first classifier is utilized to automatically classify the plurality of second text segments. In an embodiment, the text categorizer 208, in conjunction with the processor 202, may be configured to train the first classifier by utilizing the first text segments in the identified pre-specified count of clusters. The text categorizer 208 may extract one or more features, known in the art, from the first text segments in the identified pre-specified count of clusters (i.e., the training set) to train the first classifier. Examples of the one or more features may include lexical features, syntactic features, semantic features, Bag of words features, and/or the like.

In another embodiment, the text categorizer 208 may utilize the weighted first text segments associated with the pre-specified count of clusters to train the first classifier. Thereafter, the text categorizer 208 may utilize the trained first classier to classify each of the plurality of the second text segments into categories associated with the pre-specified count of clusters. For example, the text categorizer 208 may utilize the trained first classifier to classify the plurality of second text segments corresponding to the target domain "$T_1$" into the categories (i.e., "$C_5$" and "$C_6$") associated with the pre-specified count, "2", of clusters (i.e., "Cluster_5" and "Cluster_6").

A person having ordinary skill in the art will understand that the scope of the abovementioned example is for illustrative purpose and should not be construed to limit the scope of the disclosure.

Then, the control passes to end step 416.

Figure 5A:
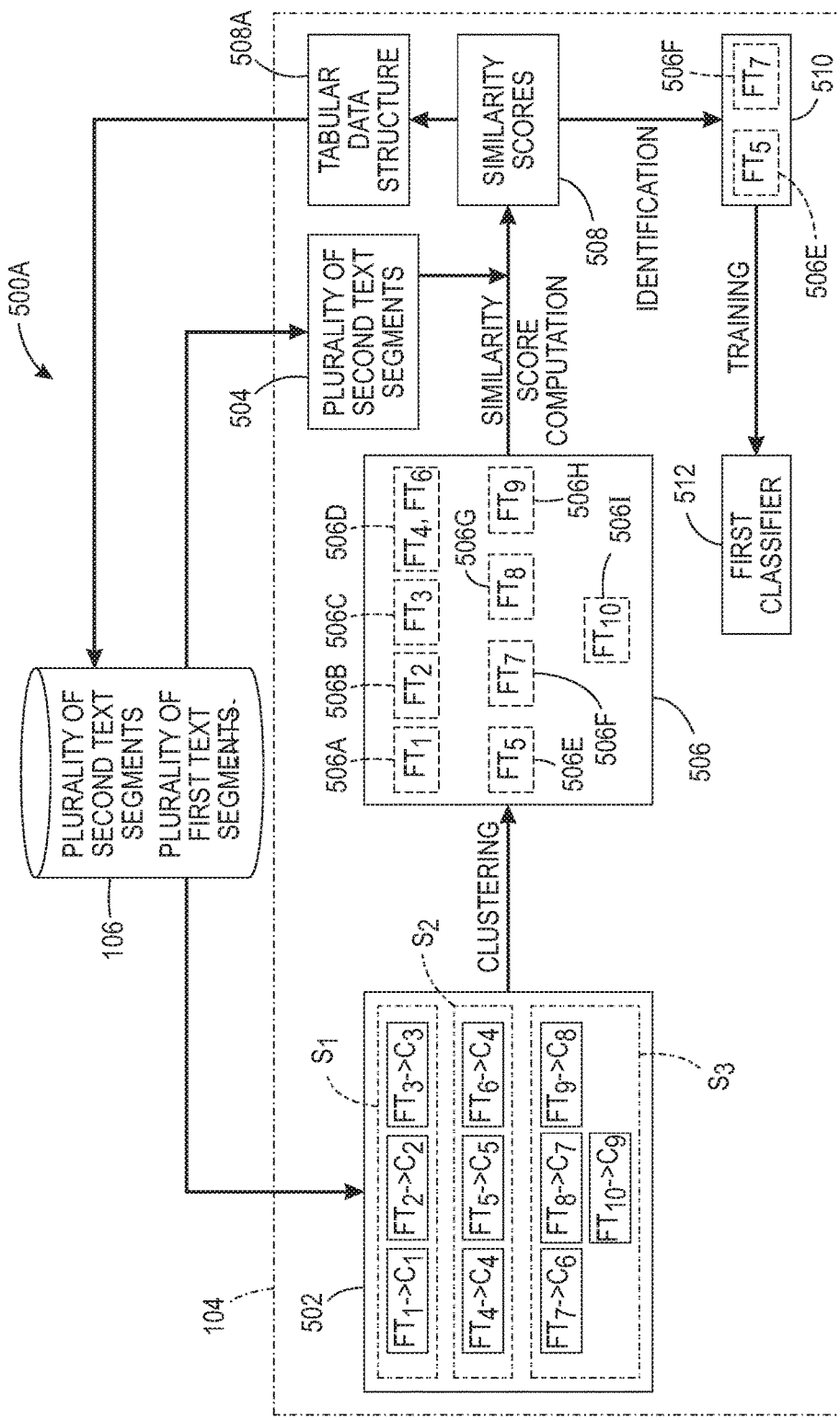
FIG. 5A is a block diagram that illustrates an exemplary scenario for training a first classifier for text classification of a target domain, in accordance with at least one embodiment.

FIG. 5A is a block diagram that illustrates an exemplary scenario for training the first classifier for text classification of the target domain, in accordance with at least one embodiment. FIG. 5A has been explained in conjunction with FIGS. 1-4. With reference to FIG. 5A, there is shown an exemplary scenario 500a for training the first classifier for text classification of the target domain.

Based on a query received from a user-computing device 102, the application server 104 may retrieve a plurality of first text segments 502 corresponding to a plurality of source domains (i.e., "$S_1$", "$S_2$", and "$S_3$") from the database server 106. In an embodiment, the query may be received from a user associated with the user-computing device 102, such as a service provider, who wants to classify a plurality of second text segments 504 into a specific count of categories. The plurality of second text segments 504 may be associated with the target domain "$T_1$" that corresponds to a product/service provided by the service provider. Thus, the received query comprises the specific count specified by the service provider.

Further, the application server 104 may retrieve the plurality of second text segments 504 corresponding to the target domain "$T_1$" from the database server 106. A first text segment, such as "$FT_1$", of the plurality of first text segments 502 is associated with a category, such as "$C_1$", of the plurality of categories. In an embodiment, the application server 104 may be configured to determine the score for each of the plurality of first text segments 502 and the plurality of second text segments 504. Thereafter, the application server 104 may cluster the plurality of first text segments 502 into the plurality of clusters 506. The plurality of clusters 506 is generated from the plurality of first text segments 502 based on the association of the plurality of first text segments 502 with the plurality of categories. The plurality of clusters 506 comprises clusters 506a to 506i. Each of the plurality of clusters 506 is associated with a category of the plurality of categories. Further, first text segments that are associated with a same category are in the same cluster. For example, the cluster 506d is associated with category "$C_4$", and "$FT_4$" and "$FT_6$" are associated with category "$C_4$". Thus, "$FT_4$" and "$FT_6$" are in the same cluster 506d.

Thereafter, the application server 104 may compute the similarity score 508 of each of the plurality of second text segments 504 for each of the plurality of clusters 506. The application server 104 may store the similarity scores as a tabular data structure 508a in the database server 106.

Further, the application server 104 may identify the pre-specified count of clusters 510 from the plurality of clusters 506 based on the computed similarity scores 508. The count of the pre-specified count of clusters is specified in the received query. The pre-specified count of clusters 510 comprises two clusters (i.e., 506e and 506f). The pre-specified count of clusters 510 encompasses the maximum count of the plurality of second text segments 504. The application server 104 may utilize the first text segments (i.e., "$FT_5$" and "$FT_7$") associated with the pre-specified count of clusters 510 to train the first classifier 512.

In an embodiment, the application server 104 may utilize the second classifier to assign weights to the first text segments (i.e., "$FT_5$" and "$FT_7$") associated with the pre-specified count of clusters 510. Thereafter, application server 104 may utilize the weighted first text segments (i.e., "$FT_5$" and "$FT_7$") associated with the pre-specified count of clusters 510 to train the first classifier 512.

Figure 5B:
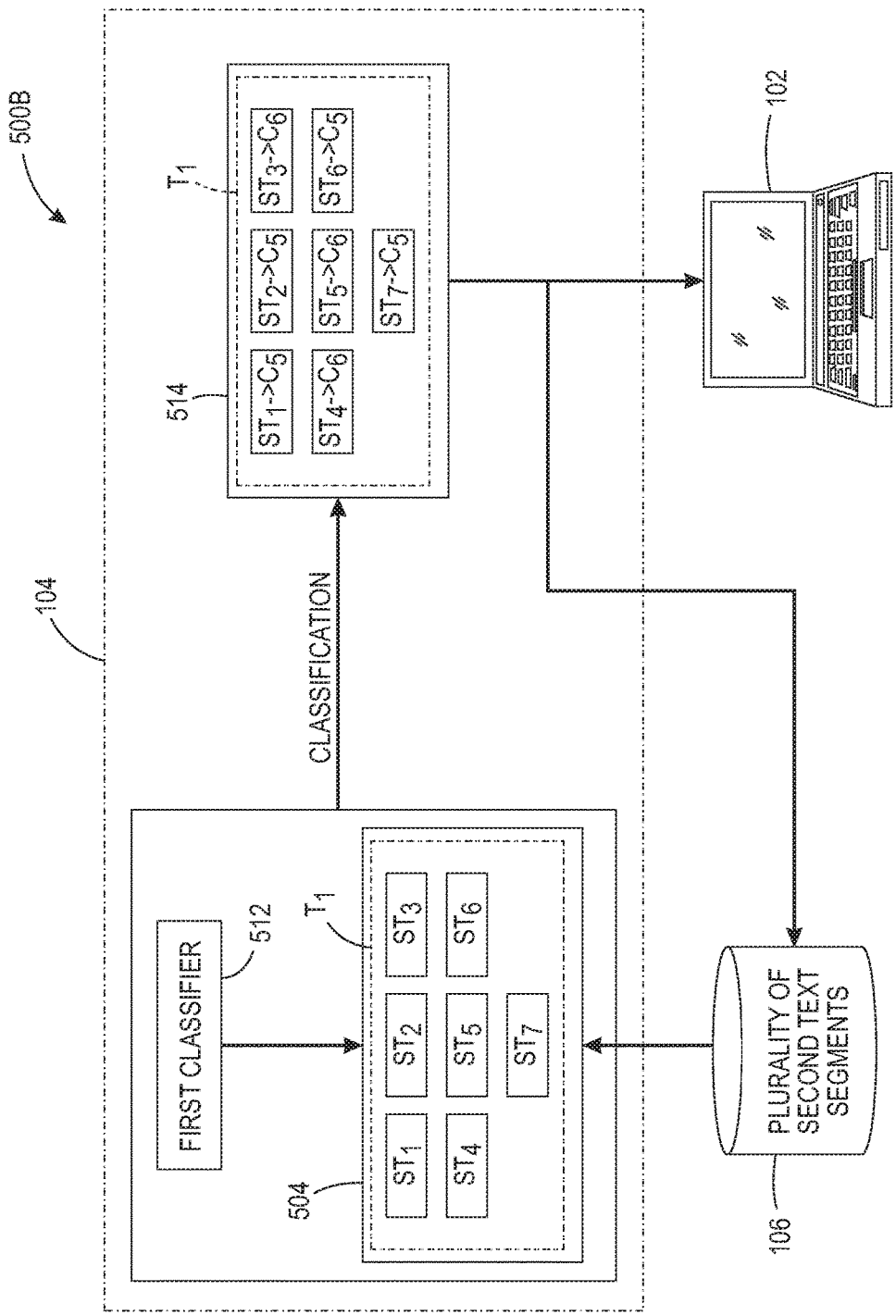
FIG. 5B is a block diagram that illustrates an exemplary scenario for classification of a plurality of second text segments by utilizing a trained first classifier, in accordance with at least one embodiment.

FIG. 5B is a block diagram that illustrates an exemplary scenario for the classification of the plurality of second text segments by utilizing the trained first classifier, in accordance with at least one embodiment. FIG. 5B has been explained in conjunction with FIGS. 1-5A. With reference to FIG. 5B, there is shown an exemplary scenario 500b for the classification of the plurality of second text segments by utilizing the trained first classifier 512.

The application server 104 may utilize the trained first classifier 512 for classifying each of the plurality of second text segments 504 into the categories associated with the pre-specified count "2" of clusters 510 (i.e., "$C_5$" and "$C_6$"). Thereafter, the application server 104 may transmit the classified plurality of second text segments 514 to the user-computing device 102 associated with the service provider. The application server 104 may further store the classified plurality of second text segments 514 in the database server 106.

A person having ordinary skill in the art will understand that the scope of the abovementioned exemplary scenario is for illustrative purpose and should not be construed to limit the scope of the disclosure.

The disclosed embodiments encompass numerous advantages. The disclosure provides a method and a system for text classification of a target domain. The disclosed method and system utilizes a plurality of first text segments, corresponding to a plurality of source domains, associated with a plurality of categories to classify a plurality of second text segments corresponding to the target domain. Thus, the disclosed method and system enables multi-source cross-domain classification of text segments. The disclosed method and system reduces an overhead to manually classify the second text segments associated with the target domain to generate a training set. The disclosed method and system automatically generates a training set for the target domain, without requiring any human intervention, by utilizing pre-classified text segments associated with the plurality of source domains. Each of the plurality of source domains contribute partially in the generation of the training set for training the classifier to classify the plurality of second text segments.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for data processing for text classification of a target domain have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context.

In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of enhancing machine learning, the method comprising:
    generating, by one or more processors, a plurality of clusters from a plurality of first text segments belonging to a plurality of source domains, based on an assignment of the plurality of first text segments to a plurality of categories, wherein the plurality of first text segments comprise a plurality of keywords, a cluster in the plurality of clusters is assigned to a category in the plurality of categories, and the source domain is a plurality of technical or business fields to which the plurality of first text segments is related belongs;
    determining, by the one or more processors, a centroid for each of the plurality of clusters based on a first keyword score of a keyword of the plurality of keywords in the plurality of first text segments in each of the plurality of clusters, the first keyword score being directly proportional to a number of times the keyword appears in a first text segment of the plurality of first text segments and inversely proportional to a number of times the keyword appears in the plurality of first text segments, wherein the centroid is an average of first keyword scores in the plurality of first text segments in each cluster;
    computing, by the one or more processors, a similarity score of each of a plurality of second text segments belonging to a target domain for each of the plurality of clusters, wherein the plurality of second text segments comprise one or more keywords of the plurality of keywords, a second keyword score being directly proportional to a number of times the keyword appears in a second text segment of the plurality of second text segments and inversely proportional to a number of times the keyword appears in the plurality of second text segments, the computed similarity score is frequency-based and stored as a tabular data structure, each element in a row of the tabular data structure represents the similarity score between a second text segment in the plurality of second text segments and a cluster in the plurality of clusters, the target domain is a technical field or a business field to which the plurality of second text segments belongs, and the similarity score is computed based on the centroid of each of the plurality of clusters and the second keyword score;
    identifying, by the one or more processors, a pre-specified count of clusters from the plurality of clusters, based on the computed similarity score, wherein the identified pre-specified count of clusters encompasses a maximum count of the plurality of second text segments; and
    training, by the one or more processors, a first classifier by utilizing a training set comprising first text segments in the identified pre-specified count of clusters, wherein the trained first classifier is utilized to automatically classify the plurality of second text segments into categories to which the identified pre-specified count of clusters is assigned, wherein the training enhances machine learning in the target domain.

2. The method of claim 1, further comprising retrieving, by the one or more processors, the plurality of first text segments and the plurality of second text segments, wherein the first text segment in the plurality of first text segments is belongs to the category of the plurality of categories, and wherein the plurality of second text segments is independent of the plurality of categories.

3. The method of claim 1, wherein the identification of the pre-specified count of clusters is based on a maximum coverage technique.

4. The method of claim 1, further comprising determining, by the one or more processors, a weight for one or more of the plurality of first text segments associated with the identified pre-specified count of clusters by use of a second classifier.

5. The method of claim 4, wherein the first classifier is trained by utilizing the weighted one or more of the plurality of first text segments to automatically classify the plurality of second text segments into the categories associated with the identified pre-specified count of clusters.

6. The method of claim 1, wherein the first keyword score, the second keyword score, and the centroid each comprise a vector quantity.

7. The method of claim 1, wherein the similarity score is computed using the following equation:

$$\text{Similarity Score }(\text{centroid}_q, ST_i) = \frac{\text{centroid}_q \cdot ST_i}{\|\text{centroid}_q\| \|ST_i\|}$$

where,
    $\text{centroid}_q$ represents the centroid, wherein the centroid is of a $q^{th}$ cluster in the plurality of clusters;
    $ST_i$ represents the second keyword score, wherein the second keyword score is of an $i^{th}$ second text segment in the plurality of second text segments;
    $\|ST_i\|$ is a count of keywords in the $i^{th}$ second text segment;
    $\|\text{centroid}_q\|$ is a count of centroid values in the centroid of the $q^{th}$ cluster; and Similarity Score (centroid$_q$,ST$_i$) is the similarity score, wherein the similarity score is of the i$^{th}$ second text segment for the q$^{th}$ cluster.

8. A system for enhancing machine learning, the system comprising:
one or more processors configured to:
generate a plurality of clusters from a plurality of first text segments belonging to a plurality of source domains, based on an assignment of the plurality of first text segments to a plurality of categories, wherein the plurality of first text segments comprise a plurality of keywords, a cluster in the plurality of clusters is assigned to a category in the plurality of categories, and the source domain is a plurality of technical or business fields to which the plurality of first text segments belongs;
determine, by the one or more processors, a centroid for each of the plurality of clusters based on a first keyword score of a keyword of the plurality of keywords in the plurality of first text segments in each of the plurality of clusters, the first keyword score being directly proportional to a number of times the keyword appears in a first text segment of the plurality of first text segments and inversely proportional to a number of times the keyword appears in the plurality of first text segments, wherein the centroid is an average of first keyword scores in the plurality of first text segments in each cluster;
compute a similarity score of each of a plurality of second text segments belonging to a target domain for each of the plurality of clusters, wherein the plurality of second text segments comprise one or more keywords of the plurality of keywords, a second keyword score being directly proportional to a number of times the keyword appears in a second text segment of the plurality of second text segments and inversely proportional to a number of times the keyword appears in the plurality of second text segments, the computed similarity score is frequency-based and stored as a tabular data structure, each element in a row of the tabular data structure represents the similarity score between a second text segment in the plurality of second text segments and a cluster in the plurality of clusters, the target domain is a technical field or a business field to which the plurality of second text segments belongs, and the similarity score is computed based on the centroid of each of the plurality of clusters and the second keyword score;
identify a pre-specified count of clusters from the plurality of clusters, based on the computed similarity score, wherein the identified pre-specified count of clusters encompasses maximum count of the plurality of second text segments; and
train a first classifier by utilizing a training set comprising first text segments in the identified pre-specified count of clusters, wherein the trained first classifier is utilized to automatically classify the plurality of second text segments into categories to which the identified pre-specified count of clusters is assigned, wherein the training enhances machine learning in the target domain.

9. The system of claim 8, wherein the one or more processors are further configured to retrieve the plurality of first text segments and the plurality of second text segments, wherein the first text segment in the plurality of first text segments belongs to the category of the plurality of categories, and wherein the plurality of second text segments is independent of the plurality of categories.

10. The system of claim 8, wherein the identification of the pre-specified count of clusters is based on a maximum coverage technique.

11. The system of claim 8, wherein the one or more processors are further configured to determine a weight for one or more of the plurality of first text segments associated with the identified pre-specified count of clusters by use of a second classifier.

12. The system of claim 11, wherein the first classifier is trained by utilizing the weighted one or more of the plurality of first text segments to automatically classify the plurality of second text segments into the categories associated with the identified pre-specified count of clusters.

13. The system of claim 8, wherein the plurality of technical or business fields of the source domain comprises the technical field, the business field, or both, of the target domain.

14. The system of claim 8, wherein the first keyword score, the second keyword score, and the centroid each comprise a vector quantity.

15. The system of claim 8, wherein the similarity score is computed using the following equation:

$$\text{Similarity Score } (\text{centroid}_q, ST_i) = \frac{\text{centroid}_q \cdot ST_i}{\|\text{centroid}_q\| \|ST_i\|}$$

where,
centroid$_q$ represents the centroid, wherein the centroid is of a q$^{th}$ cluster in the plurality of clusters;
ST$_i$ represents the second keyword score, wherein the second keyword score is of an i$^{th}$ second text segment in the plurality of second text segments;
$\|ST_i\|$ is a count of keywords in the i$^{th}$ second text segment;
$\|\text{centroid}_q\|$ is a count of centroid values in the centroid of the q$^{th}$ cluster; and
Similarity Score (centroid$_q$,ST$_i$) is the similarity score, wherein the similarity score is of the i$^{th}$ second text segment for the q$^{th}$ cluster.

16. A computer program product for use with a computer, the computer program product comprising a non-transitory computer readable medium, wherein the non-transitory computer readable medium stores a computer program code for enhancing machine learning, wherein the computer program code is executable by one or more processors to:
generate a plurality of clusters from a plurality of first text segments belonging to a plurality of source domains, based on an assignment of the plurality of first text segments to a plurality of categories, wherein the plurality of first text segments comprise a plurality of keywords, a cluster in the plurality of clusters is assigned to a category in the plurality of categories, and the source domain is a plurality of technical or business fields to which the plurality of first text segments belongs;
determine, by the one or more processors, a centroid for each of the plurality of clusters based on a first keyword score of a keyword of the plurality of keywords in the plurality of first text segments in each of the plurality of clusters, the first keyword score being directly proportional to a number of times the keyword appears in a first text segment of the plurality of first text segments and inversely proportional to a number of times the keyword appears in the plurality of first text segments, wherein the centroid is an average of first keyword scores in the plurality of first text segments in each cluster;

compute a similarity score of each of a plurality of second text segments belonging to a target domain for each of the plurality of clusters, wherein the plurality of second text segments comprise one or more keywords of the plurality of keywords, a second keyword score being directly proportional to a number of times the keyword appears in a second text segment of the plurality of second text segments and inversely proportional to a number of times the keyword appears in the plurality of second text segments, the computed similarity score is frequency-based and stored as a tabular data structure, each element in a row of the tabular data structure represents the similarity score between a second text segment in the plurality of second text segments and a cluster in the plurality of clusters, the target domain is a technical field or a business field to which the plurality of second text segments belongs, and the similarity score is computed based on the centroid of each of the plurality of clusters and the second keyword score;

identify a pre-specified count of clusters from the plurality of clusters, based on the computed similarity score, wherein the identified pre-specified count of clusters encompass maximum count of the plurality of second text segments; and train a first classifier by utilizing a training set comprising first text segments in the identified pre-specified count of clusters, wherein the trained first classifier is utilized to automatically classify the plurality of second text segments into categories to which the identified pre-specified count of clusters is assigned, wherein the training enhances machine learning in the target domain.

17. The method of claim 1, wherein the plurality of technical or business fields of the source domain comprises the technical field, the business field, or both, of the target domain.

18. The computer program product of claim 16, wherein the plurality of technical or business fields of the source domain comprises the technical field, the business field, or both, of the target domain.

19. The computer program product of claim 16, wherein the first keyword score, the second keyword score, and the centroid each comprise a vector quantity.

20. The computer program product of claim 16, wherein the similarity score is computed using the following equation:

$$\text{Similarity Score (centroid}_q, ST_i) = \frac{\text{centroid}_q \cdot ST_i}{\|\text{centroid}_q\| \|ST_i\|}$$

where,
- $\text{centroid}_q$ represents the centroid, wherein the centroid is of a $q^{th}$ cluster in the plurality of clusters;
- $ST_i$ represents the second keyword score, wherein the second keyword score is of an $i^{th}$ second text segment in the plurality of second text segments;
- $\|ST_i\|$ is a count of keywords in the $i^{th}$ second text segment;
- $\|\text{centroid}_q\|$ is a count of centroid values in the centroid of the $q^{th}$ cluster; and
- Similarity Score ($\text{centroid}_q, ST_i$) is the similarity score, wherein the similarity score is of the $i^{th}$ second text segment for the $q^{th}$ cluster.

* * * * *